July 17, 1934.    J. W. HOLT    1,966,667
VEHICLE WHEEL
Original Filed Aug. 25, 1928    3 Sheets-Sheet 1
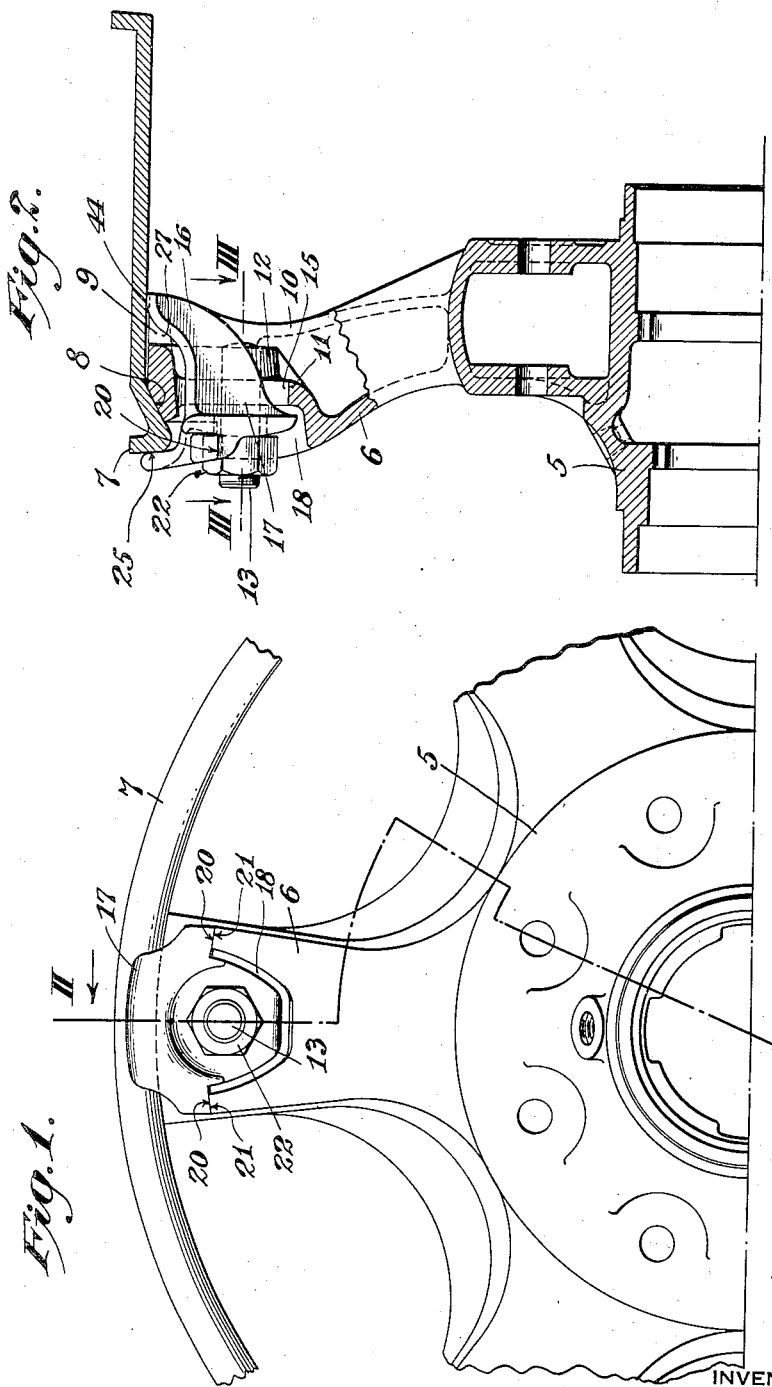
INVENTOR:
John Washburn Holt
BY
Clarence D Kerr
ATTORNEY.

July 17, 1934.   J. W. HOLT   1,966,667
VEHICLE WHEEL
Original Filed Aug. 25, 1928   3 Sheets-Sheet 2

INVENTOR:
John Washburn Holt
BY
Clarence D Kerr
ATTORNEY

July 17, 1934.   J. W. HOLT   1,966,667
VEHICLE WHEEL
Original Filed Aug. 25, 1928   3 Sheets-Sheet 3
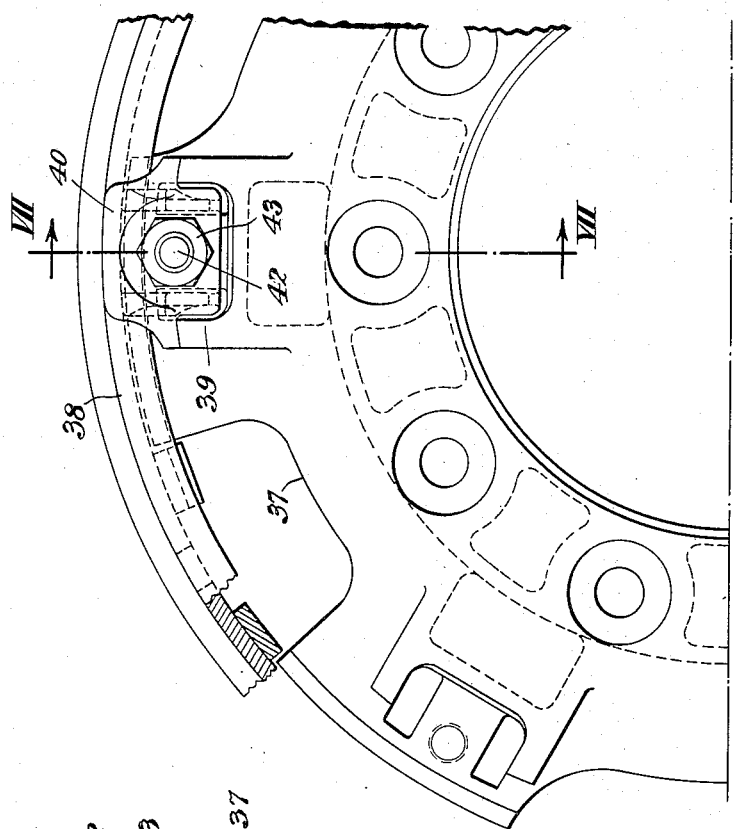
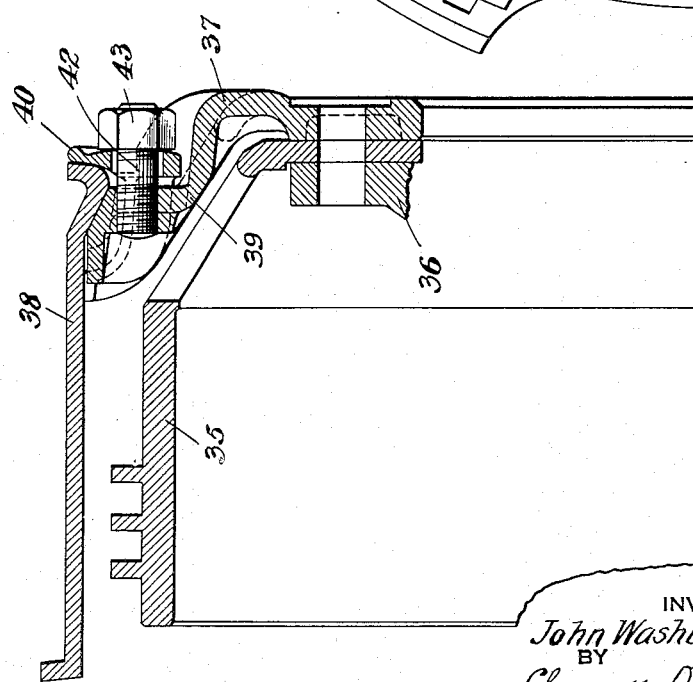
INVENTOR:
John Washburn Holt
BY
Clarence D Kerr
ATTORNEY Patented July 17, 1934

1,966,667

UNITED STATES PATENT OFFICE 1,966,667

VEHICLE WHEEL

John Washburn Holt, Cleveland Heights, Ohio

Application August 25, 1928, Serial No. 301,954
Renewed January 3, 1933

13 Claims. (Cl. 301—12)

The present invention relates to wheels and has for an object to provide an improved metal wheel of the type having a demountable rim.

The invention has been developed in connection with the production of a vehicle wheel having a spider of malleable cast iron with a demountable rim secured thereto and for convenience of disclosure such an embodiment will be described to illustrate the principles of the invention.

The nature and object of the invention will more clearly appear from a description of a selected embodiment for the purpose of which description reference should be had to the accompanying drawings forming a part hereof and in which—

Figure 3:
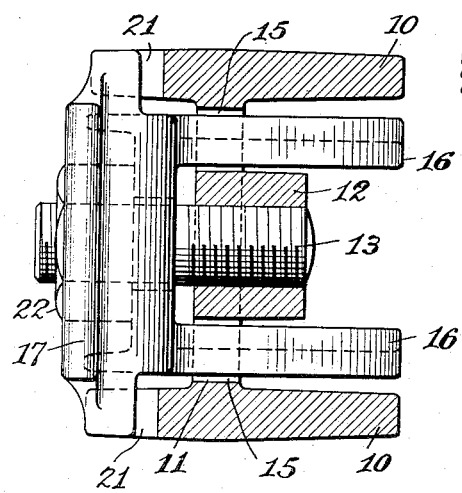
Figure 4:
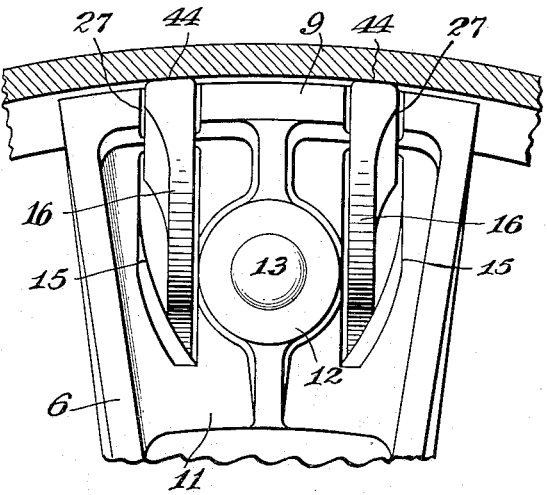
Figure 5:
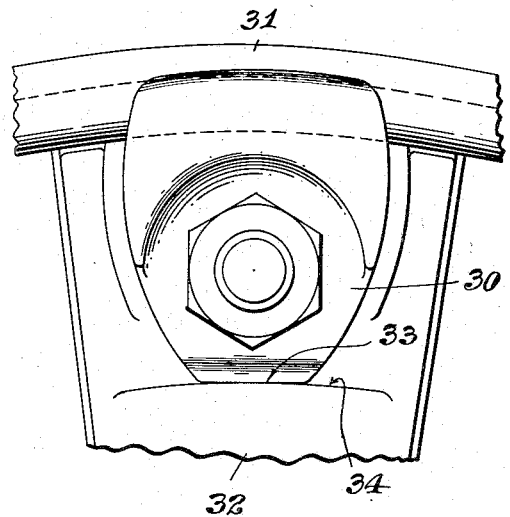
Figure 6:
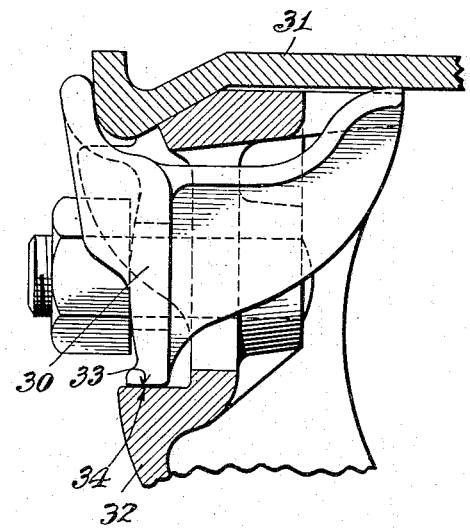

Figure 1 is a fragmentary front view of a wheel constructed in accordance with the invention, Figure 2 is a sectional view of the same taken on the line II—II of Fig. 1 with the clip shown in full, Figure 3 is a detail sectional view taken on the line III—III of Fig. 2, Figure 4 is a rear detail view of the spoke end and clip, Figure 5 is a detail front view showing a modified form of construction of the clip, Figure 6 is a detailed sectional view of the clip and spoke shown in Fig. 5, Figure 7 is a central sectional view of an embodiment of the invention taken on the line VII—VII of Fig. 8, and Figure 8 is a front view of the structure shown in Fig. 7.

In the wheel shown in Figs. 1 to 4 the spider 5 terminates in a plurality of spokes 6 carrying a demountable rim 7. Each spoke end is formed with a tapered rim seat 8 and a rearwardly extending non-tapered flange 9 with inwardly extending side walls 10, Fig. 3, and a connecting web 11 having a boss 12 to receive the clamping bolt 13. The web 11 is slotted at 15 on each side of the boss 12 to receive the rearwardly projecting arms 16 of the rim securing clip 17. The web 11 and the side walls 10 are so shaped as to provide a recess 18, as best indicated in Fig. 2, to receive the head of the clip 17. Laterally projecting shoulders 20 on the clip engage corresponding shoulders 21 suitably formed on the spoke end, as best shown in Fig. 1, the engaging surfaces of these shoulders lying parallel to the axis of the spider, whereby movement of the clip during the clamping and securing operation is parallel to the axis of the spider. The clip 17 is drawn to position and secured in place by the stud bolt 13 and nut 22 thereon, the arrangement being such that the axis of the bolt 13 and the bearing surfaces 21 along which the clip moves are parallel to the axis of the spider. The inclined rim seat 8 is preferably continuous over the end of the spoke and provides an extended bearing for the tapered portion of the rim. The clip 17 engages the edge of the rim 7, as indicated at 25, and the ends of the projecting arms 16 extend through the slots 15 and are curved outwardly to bear at their ends against the inner face of the rim. The non-tapered flange 9 is preferably slotted as indicated at 27, Fig. 4, to receive and guide the ends of the arms 16 whereby displacement of the clips circumferentially of the wheel is resisted by the engagement of the arms with the edges of these slots.

In this arrangement as the nut 22 is tightened the clip will move inwardly with the rim in a line parallel to the axis of the spider; in other words, during the clamping movement the position of the clip relative to the rim remains substantially fixed.

When assembling the arrangement shown the rim is applied to the spoke ends and the clip is introduced into position with a rocking movement to bring the ends of the arms 16 through the slots 15 and outwardly against the inner face of the rim as in the position shown in Fig. 2. With the clip in position, the nut may be quickly applied and tightened to draw the rim firmly to seated position. The engagement of the clip member against the inner face of the rim, as indicated at 44, acts in opposition to the force of the nut 17 to prevent rotation of the clip. The clip moves in a straight line when the nut 22 is tightened and the rim is thus effectively moved into position on the tapered rim seats. In this arrangement the effect of the forces applied to the clip are such that the full force of the nut 22 is effective to draw the demountable rim firmly onto its seat, as distinguished from the usual arrangement in which the clip fulcrums against the spoke and thus diverts a part of the clamping force of the nut.

The outward pressure of the arms 16 of the clip provides the further advantage of additionally securing the rim to the wheel. Any tendency of the rim to slip circumferentially and carry the arms 16 therewith will be resisted by the sides of the slots 27 in which the projecting ends of the arms engage.

In Figs. 5 and 6 is shown a modified form of the invention in which the clip 30 which holds the rim 31 on the spoke end 32 is in general the same as the clip 17 but it differs therefrom in that it is formed with one bearing face 33 at the lower edge thereof for engaging a shoulder 34 of the spoke end instead of having two lateral shoulders as shown at 20 in the structure of Fig. 1. This clip member is in other respects similar to the clip member 17.

In Figs. 7 and 8 is shown an adaptation of the invention in which the brake drum 35 clamped between the hub flange 36 and the spider 37 is of a diameter almost as great as the diameter of the rim 38 so that very little clearance is left for the rim clamping devices. With such a structure, a further advantage of the present invention becomes evident, which is, that only a small amount of clearance is required for the rim clamping members, in contra-distinction to the relatively large amount of space required for existing types of clamping devices which would effectively answer the present purpose where a very secure mounting is necessary. The spider terminates in spoke ends 39 which are similar to the spoke ends of the spider shown in Fig. 1 and the rim 38 is secured in place by clips 40 which are similar to the clips 17 shown in Figs. 1 to 4. A bolt 42 and nut 43 are provided for each clip.

The foregoing particular description is illustrative merely and is not intended as defining the limits of the invention.

I claim:

1. A wheel comprising a cast metal spider having radially extending rim receiving spokes, a demountable rim seating on such spokes, and retaining clips for securing the rim in position on the spokes, said clips each having bearing surfaces engaging the front edge and the inside face of the rim rearwardly of the spoke and a surface of the spoke extending parallel to the axis of the spider.

2. A wheel comprising a cast metal spider terminating in rim receiving spokes, a demountable rim seating thereon and retaining clips for securing the rim in position each having a projecting arm extending rearwardly beyond the rear side of the spoke and engaging the inside of the rim.

3. A wheel comprising a cast metal spider terminating in rim receiving spokes, a demountable rim seating thereon and retaining clips for securing the rim in position each having spaced arms projecting through slots in the spokes and engaging the inner face of the rim.

4. A wheel comprising a cast metal spider terminating in rim receiving spokes, a demountable rim seating thereon and retaining clips for securing the rim in position each having spaced arms projecting through slots in the spokes and engaging the inner face of the rim, and each bearing against a surface on the spoke lying parallel to the axes of the spider.

5. A wheel comprising a cast metal spider terminating in rim receiving spokes, a demountable rim seating thereon and retaining clips for securing the rim in position said spokes being formed with transverse slots spaced inwardly from the rim seating surfaces and said retaining clips being formed with parallel arms extending through said slots and curved outwardly at their free ends to engage the inner face of the rim.

6. A wheel as defined in claim 5, wherein the clips bear against the spider on surfaces lying parallel to the axis of the spider.

7. A wheel comprising a cast metal spider having radially extending rim receiving spokes, a demountable rim seating on said spokes, recesses in the lateral faces of said spokes, and retaining clips mounted in said recesses for securing the rim in position on the spokes, said clips each having bearing surfaces engaging the front edge and the inside face of the rim rearwardly of the spoke and a surface of the spoke extending parallel to the axis of the spider.

8. A wheel comprising a cast metal spider having radially extending rim receiving spokes, a demountable rim seating on said spokes, and retaining clips for securing the rim in position on said spokes, said clips each having spaced arms engageable with the inner face of the rim rearwardly of the spokes to resist tilting of the clip.

9. A wheel comprising a cast metal spider having radially extending rim receiving portions, inclined seats on said portions, a demountable rim seating upon said seats, threaded bolts mounted in said portions, retaining clips mounted on said bolts for securing said rim in position on said seats when drawn up by nuts on said threaded bolts, said clips having a surface engaging the front edge of the rim, a shoulder engaging the surface of said rim receiving portions which surface is independent of said rim receiving seats and located closer to the center of the wheel, and a rearwardly extending element engaging the inside surface of the rim rearwardly of the outside edge of the engagement between said rim and said seats.

10. A wheel comprising a cast metal spider having radially extending rim receiving spokes, a demountable rim seating on such spokes, and retaining clips for securing the rim in position on the spokes, said clips each having bearing surfaces engaging the front edge and inside face of the rim rearwardly of at least a portion of the spoke engaging face, and a surface of the spoke extending axially of said spider.

11. In a vehicle wheel for supporting a demountable rim, seats on said wheel engaging said rim along one side only thereof, and one-piece laterally-extending clip members engaging the rim at a plurality of points and securing the rim to the wheel.

12. In a vehicle wheel for supporting a demountable rim, seats on said wheel engaging said rim along one side only thereof, and clips carried by said wheel for engaging said rim at the front and extending rearwardly of said seats into engagement with said rim at circumferentially-spaced points on its inner periphery.

13. In a vehicle wheel for supporting a demountable rim, seats on said wheel engaging said rim along one side only thereof, and circumferentially-spaced clip means contacting the front of said rim and extending back into further contact with the rim on its inner periphery, the distance between such points of front and rear contact being constant.

JOHN WASHBURN HOLT.